(12) United States Patent
Reatti

(10) Patent No.: US 7,106,659 B2
(45) Date of Patent: Sep. 12, 2006

(54) DEVICE FOR ACOUSTIC RODENT CONTROL

(75) Inventor: Guido Reatti, Padua (IT)

(73) Assignee: Multitecno S.R.L., Fossalta Di Portogruaro (IT)

( * ) Notice: Subject to any disclaimer, the term of this patent is extended or adjusted under 35 U.S.C. 154(b) by 344 days.

(21) Appl. No.: 10/478,183

(22) PCT Filed: May 16, 2002

(86) PCT No.: PCT/EP02/05427

§ 371 (c)(1),
(2), (4) Date: Nov. 19, 2003

(87) PCT Pub. No.: WO02/096196

PCT Pub. Date: Dec. 5, 2002

(65) Prior Publication Data

US 2004/0151069 A1    Aug. 5, 2004

(30) Foreign Application Priority Data

May 29, 2001  (IT) ........................... PD2001A0124

(51) Int. Cl.
*A01M 29/02* (2006.01)
*H04B 1/02* (2006.01)
(52) U.S. Cl. .................................................. 367/139
(58) Field of Classification Search ................ 367/139, 367/13; 119/719; 340/384.2, 384; 116/22 A
See application file for complete search history.

(56) References Cited

U.S. PATENT DOCUMENTS

| 3,879,702 A | 4/1975 | Mancone |
| 3,931,865 A * | 1/1976 | Levitt ........................ 367/139 |
| 4,037,222 A * | 7/1977 | Solomon .................... 367/13 |
| 4,771,403 A | 9/1988 | Maskovyak et al. |
| 5,191,520 A | 3/1993 | Eckersley |
| 5,278,537 A | 1/1994 | Carlo |
| 5,477,091 A | 12/1995 | Fiorina |
| 5,598,379 A * | 1/1997 | Malleolo .................... 367/139 |
| 6,212,088 B1 | 4/2001 | Yoo |

FOREIGN PATENT DOCUMENTS

| DE | 29 17 832 | 11/1980 |
| DE | 42 24 755 | 2/1994 |
| EP | 0 282 673 | 9/1988 |
| EP | 0 376 738 | 7/1990 |
| FR | 2 621 771 | 4/1989 |
| GB | 2 071 889 | 9/1981 |
| WO | 01 03279 | 1/2001 |

* cited by examiner

*Primary Examiner*—Daniel Pihulic
(74) *Attorney, Agent, or Firm*—Modiano & Associati; Albert Josif; Daniel J. O'Byrne

(57) ABSTRACT

A device for acoustic rodent control, comprising a diffuser constituted by a contoured solid of revolution that is provided, in a downward region, with a cavity in which a piezoelectric element is applied, the piezoelectric element being controlled by an electronic board contained in a box body that supports the diffuser; the electronic board supports an electronic circuit that comprises means for detecting the vibratory state of the piezoelectric element.

18 Claims, 4 Drawing Sheets

DEVICE FOR ACOUSTIC RODENT CONTROL

BACKGROUND OF THE INVENTION

The present invention relates to a device for acoustic rodent control.

It is known that currently commercially available rodent control methods include some that use sound vibrations emitted by particular devices; these vibrations are perceived by rodents, which move away from the covered area because they are stressed by such vibrations.

Italian patent No. 1288012 by the same Applicant discloses a diffuser for acoustic rodent control devices that is substantially constituted by a solid of revolution shaped so as to form three annular peripheral rings which are mutually axially spaced, with an upper concave surface and a lower recess.

A piezoelectric device, controlled by an electronic circuit, is applied inside the lower recess.

The recess is then closed by a cover that is provided with a central hole having a threaded axial shank, for fixing the body to a support.

The diffuser allows to convert the structural noise generated internally by the piezoelectric element into airborne noise without openings or auxiliary devices such as loudspeakers, with a great benefit in terms of mechanical safety and reliability, for use in the most challenging operating conditions required by the various applications.

Although considerable advantages are obtainable by the use of a diffuser as described above, said diffuser entails drawbacks.

There is in fact absolutely no centralized control over a set of transducers.

Moreover, the cavity of the diffuser that contains the piezoelectric element is too small.

The dynamic system of the piezoelectric element is in fact very critical, since the vibratory state of the ceramic wafer generates a beam of vibrations which, reflected by the metallic cover, return toward the wafer, applying a contrast force to the piezoelectric element, which thus abandons the base frequency and eliminates the efficiency of the system.

In this manner, the piezoelectric element has a very short life.

Further, the cavity of the diffuser is too small even for the space occupied by an electronic board.

In order to eliminate the acoustic pressure that is generated in the cavity, a hole is provided in the cover.

However, this remedy caused loss of watertightness of the cavity, with a consequent rapid oxidation of the ceramics of the piezoelectric element, further reducing its life.

SUMMARY OF THE INVENTION

The aim of the present invention is to solve or substantially reduce the problems of known devices for acoustic rodent control.

Within this aim, an object of the invention is to provide a device that has a system for detecting operating anomalies.

Another object is to provide a device whose correct operation can also be controlled remotely.

Another object is to provide a device that has a simple structure.

Another object is to provide a device that can be manufactured at a low cost, possibly by using diffusers that are already commercially available.

This aim and these and other objects that will become better apparent hereinafter are achieved by a device for acoustic rodent control, comprising a diffuser constituted by a contoured solid of revolution that is provided, in a downward region, with a cavity in which a piezoelectric element is applied, characterized in that said piezoelectric element is controlled by an electronic board contained in a box-like body that supports the diffuser, the electronic board supporting an electronic circuit that comprises means for detecting the vibratory state of the piezoelectric element.

BRIEF DESCRIPTION OF THE DRAWINGS

Further characteristics and advantages of the present invention will become better apparent from the following detailed description of a preferred but not exclusive embodiment thereof, illustrated only by way of non-limitative example in the accompanying drawings, wherein.

DESCRIPTION OF THE PREFERRED EMBODIMENTS

Figure 1:
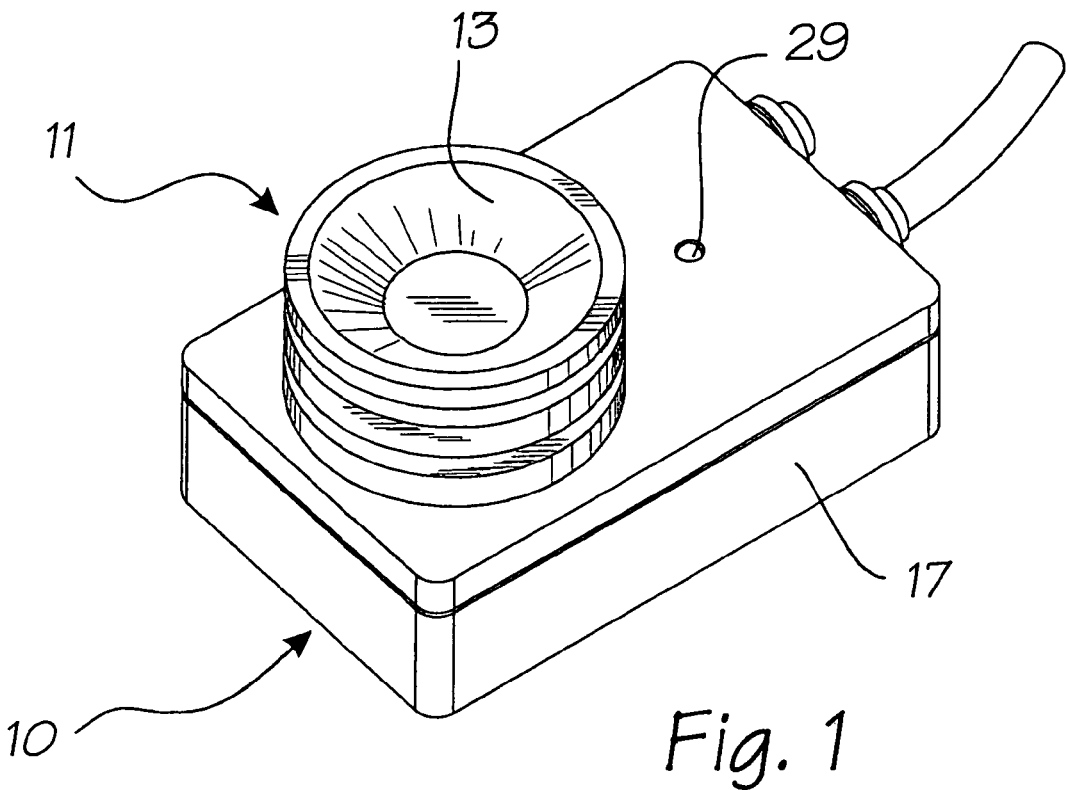
FIG. 1 is a perspective view of a device according to the invention.
Figure 2:
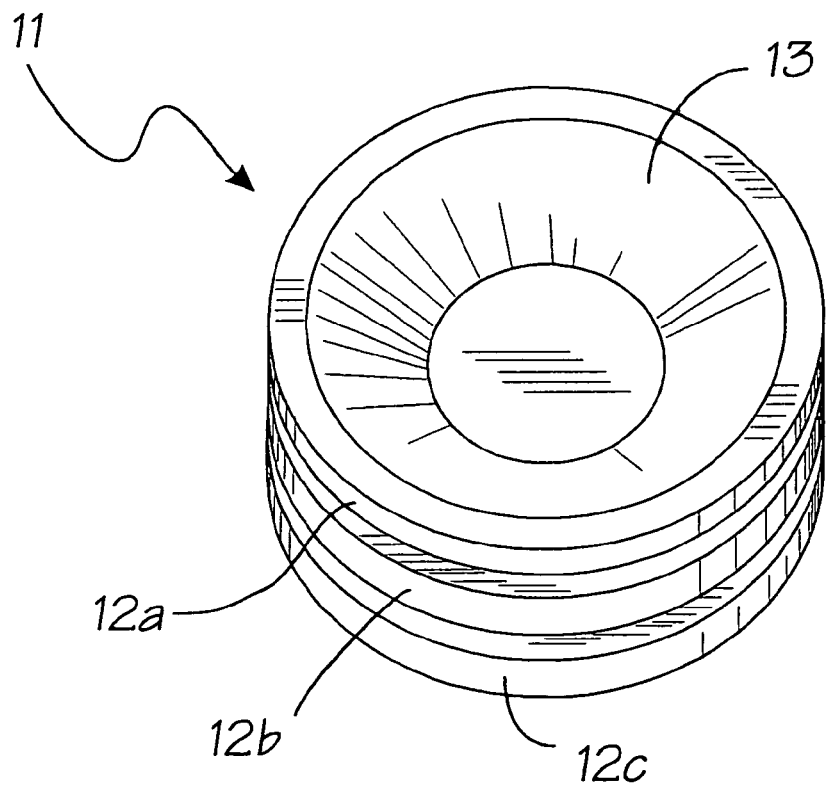
FIG. 2 is a view of the diffuser of the device of FIG. 1.
Figure 3:
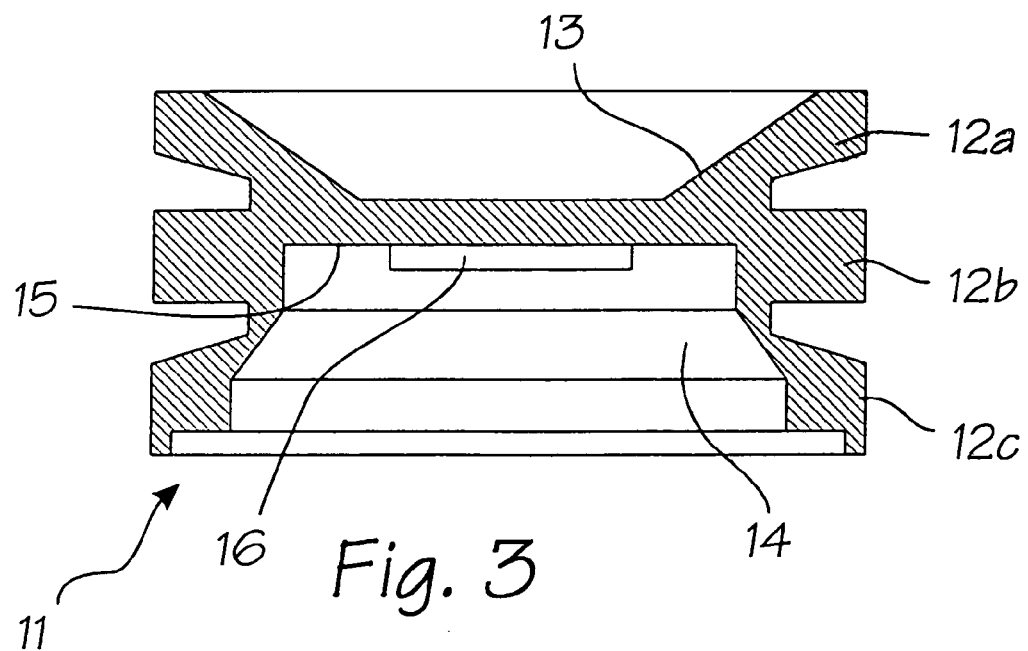
FIG. 3 is a transverse sectional view of the diffuser.
Figure 4:
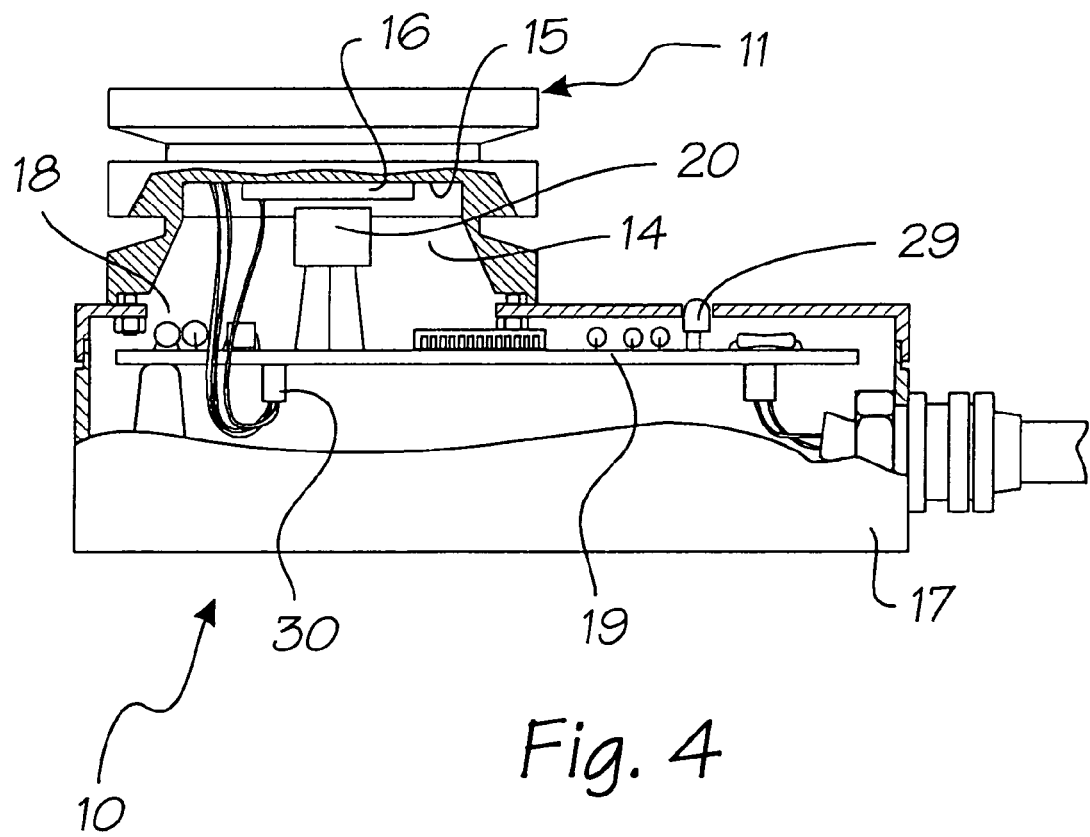
FIG. 4 is a partially sectional side view of the device of FIG. 1.
Figure 5:
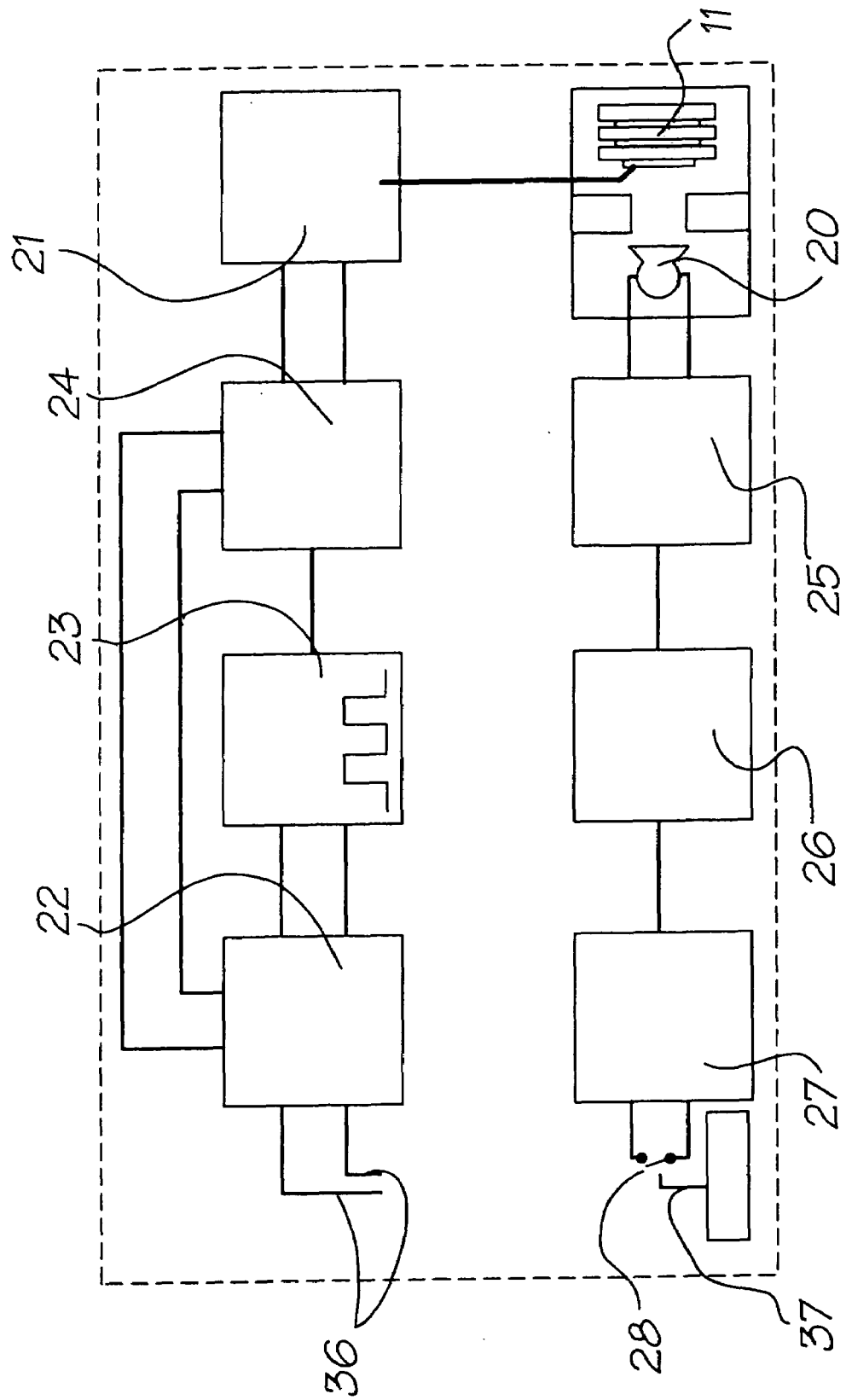
FIG. 5 is a functional block diagram of the device according to the invention.

With reference to the figures, a device for acoustic rodent control, according to the invention, is generally designated by the reference numeral 10.

The device 10 comprises a diffuser 11, which is constituted by a solid of revolution made of metallic material, preferably brass, which is shaped so as to form three annular peripheral rings 12a, 12b and 12c, which are mutually axially spaced.

The diffuser 11 is shaped in an upward region so as to form a surface 13 that is concave and in particular frustum-shaped.

In a downward region, the diffuser 11 has a cavity 14 in which there is a flat bottom 15 on which a piezoelectric element 16 is fixed.

The diffuser 11 is arranged on top of a box-like body 17, which can be opened by the user and is made of plastic material, at a wall opening 18 thereof that connects the cavity 14 to the inside of the box-like body 17.

The piezoelectric element 16 is controlled by an electronic board 19, which is contained in the box-like body 17 and supports an electronic circuit that comprises means, described in detail hereinafter, for detecting the vibratory state of the piezoelectric element 16.

The means for detecting the vibratory state of the piezoelectric element 16 comprise a microphone 20, which is arranged within the cavity 14 of the diffuser 11.

The piezoelectric element 16 is connected to an amplitude-modulated sinusoidal oscillator 21, which is connected to an automatic power supply 24, which is connected to a square-wave modulator 23, which is connected to a stabilized power supply 22, which supplies the electronic circuit and is also connected to the automatic power supply 24.

The means for detecting the vibratory state of the piezoelectric element comprise, as mentioned, the microphone 20, which is connected to an amplifier 25 for the sinusoidal signal that arrives from the microphone 20; the amplifier is connected to a voltage doubler 26, which is connected to a voltage comparator 27 suitable to excite, if the detected voltage value is different from a preset reference value, a control relay, which keeps normally closed a switch 28 which, when open, generates an alarm signal, exciting a first LED 29, which is connected to the electronic circuit and is visible from the outside of the box-like body 17.

The piezoelectric element 16 is connected by means of a quick connector 30 to the electronic board 19; this allows rapid replacement thereof in case of malfunction or failure.

Figure 6:
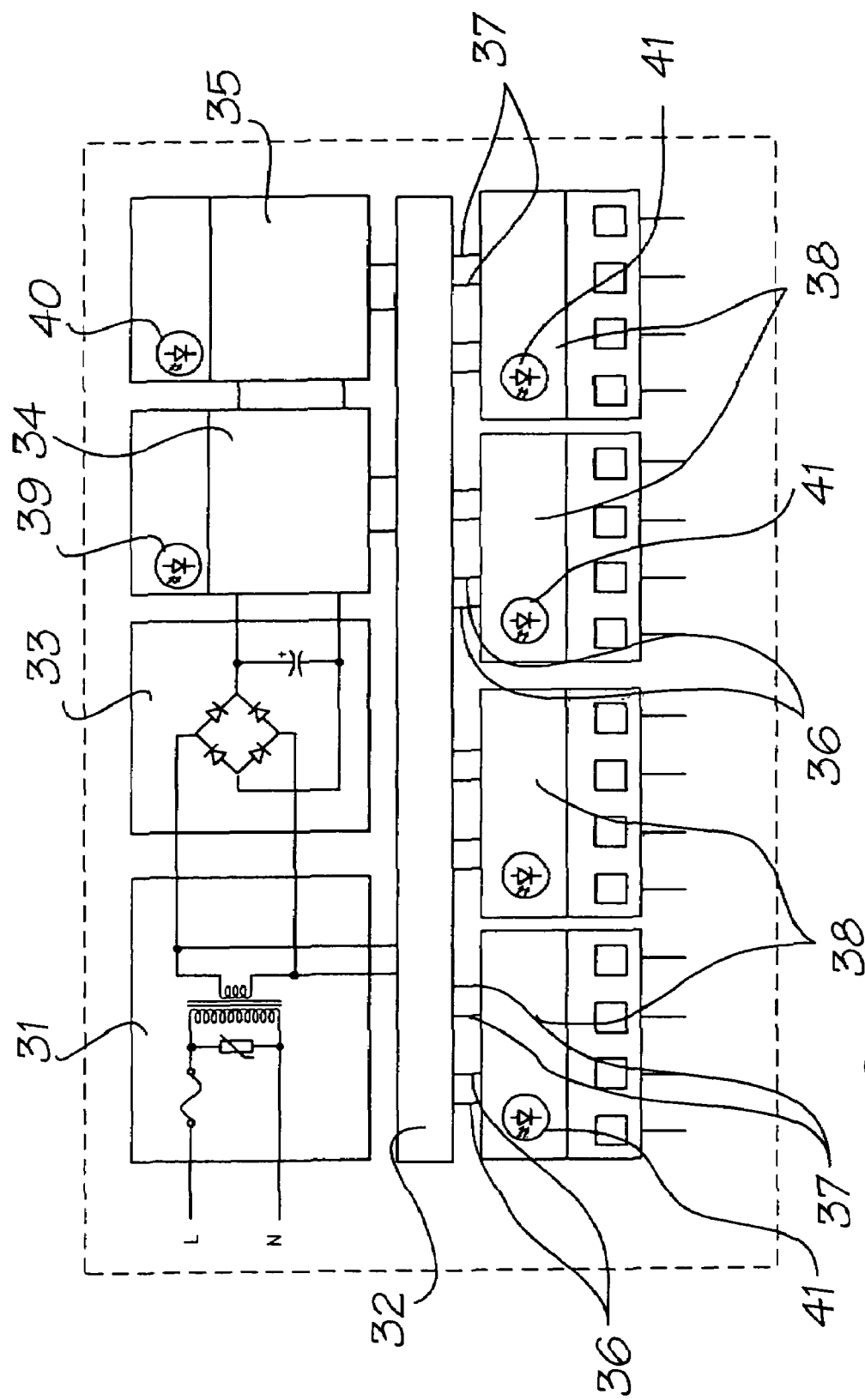
FIG. 6 is a functional block diagram of a control unit for a plurality of acoustic rodent control devices.

A plurality of devices 10 can be managed by a central power supply and control unit, described in detail hereinafter, whose functional block diagram is shown in FIG. 6.

As shown, the central power supply and control unit comprises a voltage step-down block 31, which is connected to a power supply network, to an input/output converter block 32 and to a rectifier block 33, which is in turn connected to a stabilizer block 34.

The stabilizer block 34 is connected to the input/output converter block 32 and to a final relay block 35 with alarm repeater, which is also connected to the input/output converter block 32.

Four channels 38 branch out from the input/output converter block 32 and are connected thereto by means of power supply lines 36 and control lines 37.

Each channel 38 has four devices 10 connected thereto; these devices are supplied in parallel and are connected in series to the control line 37.

The central unit is provided with a second power supply indicator LED 39, which is connected to the stabilizer block 34, with a third alarm signaling LED 40, which is connected to the final block 35, and with a fourth abnormal operation indicator LED 41, which is connected to each channel 38.

As regards operation, it is evident that a plurality of devices 10 can be connected to a central unit.

The piezoelectric element 16 is excited by means of an amplitude-modulated sinusoidal oscillator 21, so that the diffuser 11 generates a sound emission at a frequency between sound and ultrasound that is in any case suitable to generate discomfort in rodents.

The microphone 20 is used to monitor constantly the emission of the piezoelectric element, keeping excited the line control relay 28, which keeps a switch normally closed.

If there is no emission due to any anomaly affecting the wafer of the piezoelectric element 16, the microphone itself, the power supply or another component, the relay 28 is excited, opening the contact and placing the central line itself in fault mode.

At this point, the first LED 29 starts to flash, and the fourth LED 41, meant to indicate anomalies in the channel that corresponds to the faulty device 10, and the third LED 40, for repeating the alarm of the central unit, flash at the same time.

It is thus evident that it is possible to check from the central unit, simply in a visual manner, whether one or more of the devices connected to such unit is operating.

The structure of the central unit is such that it is possible to establish which of the devices 10 is malfunctioning; however, such device can also be located by using a sound-level meter.

Further, the box-like body 17 fixed to the diffuser 11 generates a sufficiently large sealed chamber, so as to avoid producing an acoustic pressure that might damage the piezoelectric element 16.

Moreover, the box-like body 17 is made of plastics, advantageously polycarbonate, which absorbs the acoustic pressure.

In practice it has been observed that the present invention has achieved the intended aim and objects.

The present invention is susceptible of numerous modifications and variations, all of which are within the scope of the same inventive concept.

The technical details can be replaced with other technically equivalent elements.

The materials employed, so long as they are compatible with the contingent use, as well as the dimensions, may be any according to requirements.

The disclosures in Italian Patent Application No. PD2001A000124 from which this application claims priority are incorporated herein by reference.

What is claimed is:

1. A device for acoustic rodent control, comprising a diffuser constituted by a contoured solid of revolution that is provided, in a downward region, with a cavity in which a piezoelectric element is applied, said piezoelectric element being controlled by an electronic board contained in a box body that supports said diffuser, said electronic board supporting an electronic circuit that comprises means for detecting the vibratory state of the piezoelectric element, said diffuser being fixed to said box body so as to form a sealed chamber that includes said cavity in which said piezoelectric board is applied, said piezoelectric element and said electronic board and said electronic circuit with said means for detecting the vibratory state of the piezoelectric element all being arranged inside said sealed chamber.

2. The device according to claim 1, wherein said detection means comprise a microphone arranged within said cavity of the diffuser.

3. The device according to claim 2, wherein said diffuser is arranged so that its cavity lies over a wall opening of said box body, said microphone passing through said opening to arrange itself within said cavity.

4. The device according to claim 1, wherein said electronic circuit comprises an amplitude-modulated sinusoidal oscillator that is connected to said piezoelectric element.

5. The device according to claim 4, wherein said electronic circuit comprises an automatic power supply, a square-wave modulator and a stabilized power supply which are connected in succession to each other, said stabilized power supply being connected to said sinusoidal oscillator and to said automatic power supply.

6. The device according to claim 2, wherein said means for detecting the vibratory state of said piezoelectric element comprise, in a sequential connection starting from said microphone, an amplifier of a sinusoidal signal that arrives from said microphone, a voltage doubler and a voltage comparator that is suitable to excite a control relay.

7. The device according to claim 1, further comprising a first alarm indicator LED, which is connected to said electronic circuit and is visible from the outside of said box body.

8. The device according to claim 1, wherein said piezoelectric element is connected to said electronic board by means of a quick connector.

9. The device according to claim 1, wherein said box body is made of plastics.

10. The device according to claim 1, wherein said box body can be opened by a user.

11. The device according to claim 5, wherein it is connected to a central stabilized power supply and control unit at said stabilized power supply and a control relay.

12. The device according to claim 11, the power supply and control unit comprising a voltage step-down block, which is connected to a power supply network, to an input/output converter block and to a rectifier block, which is in turn connected to a stabilizer block, said stabilizer block being connected to said input/output converter block and to a final relay block with alarm repeater, which is also connected to said input/output converter block, at least one power supply line and one control line for a device branching out from said converter block, said lines being connected respectively to said stabilized power supply and to said control relay.

13. The device and central unit according to claim 12, further comprising a plurality of devices that are supplied in parallel, are connected to said input/output converter block and are connected in series to said control line.

14. The device and central unit according to claim 12, further comprising four channels that branch out from said input/output converter block and are connected thereto by means of corresponding power supply and control lines, each channel having four devices connected thereto.

15. The device and central unit according to claim 12, comprising a LED for indicating the presence of the power supply, said LED being connected to said stabilizer block.

16. The device and central unit according to claim 12, comprising an alarm signaling LED, which is connected to said final relay block.

17. The device and unit according to claim 14, comprising an anomaly indicator LED, which is connected to each one of said channels.

18. The device according to claim 1, wherein said diffuser protrudes from an upper surface of said box body, said cavity and said piezoelectric element being arranged above said upper surface of said box body.

* * * * *